United States Patent [19]

Bradisse et al.

[11] Patent Number: 4,690,189

[45] Date of Patent: Sep. 1, 1987

[54] ALL-SEASON PNEUMATIC TIRE WITH CHAMFERED TREAD BLOCKS

[75] Inventors: John L. Bradisse, Munroe Falls; Daniel J. Lindner, Canal Fulton, both of Ohio

[73] Assignee: The Goodyear Tire & Rubber Company, Akron, Ohio

[21] Appl. No.: 823,696

[22] Filed: Jan. 29, 1986

[51] Int. Cl.4 .............................................. B60C 11/11
[52] U.S. Cl. ................................................. 152/209 R
[58] Field of Search ............ 152/209 R, 209 D, 209 B

[56] References Cited

U.S. PATENT DOCUMENTS 3,055,410  9/1962  Caulkins ........................... 152/209 R
4,122,879 10/1978  Takigawa et al. ............... 152/209 R
4,177,850 12/1979  Ogawa et al. .................... 152/209 R
4,619,300 10/1986  Tokunaga et al. .............. 152/209 R

*Primary Examiner*—Michael Ball
*Attorney, Agent, or Firm*—Robert W. Brown

[57] ABSTRACT

All-season radial-ply pneumatic tire for passenger and light truck vehicles. A rubber tread is positioned radially outwardly of a carcass ply and belt structure. The tread has grooves that define blocks of rubber spaced apart circumferentially around the tread. Circumferentially-spaced corners of the rubber blocks are chamfered toward the respective bottoms of the grooves, thereby, to increase their respective stiffnesses to improve their uniformity of wear and also to reduce the amplitude of sound frequencies generated by the tire in normal use.

8 Claims, 6 Drawing Figures

ALL-SEASON PNEUMATIC TIRE WITH CHAMFERED TREAD BLOCKS

BACKGROUND

This invention relates to an all-season radial-ply pneumatic tire for passenger and light-truck vehicles. An all-season pneumatic tire is regarded as one which currently qualifies for a mud and snow (M&S) rating under the criteria for such rating established by the Rubber Manufacturers Association, Akron, Ohio. In general, such rating requires that the tire tread have full-depth grooves that are angled laterally toward the respective lateral edges of the tread surface for at least one-half inch and such grooves are required to have a width of at least 0.060 inch.

All-season tires are characterized by grooves that define blocks, and sometimes one or more ribs, in the tread surface. This results in a more aggressive appearance than that of a more conventional fully-ribbed tire and provides improved traction characteristics in snow and under wet conditions as compared to the conventional ribbed tire. All-season tires are distinguished from snow tires in that the former are required to satisfy all Federal Motor Vehicle Safety Standard 109 tests applicable to radial passenger tires in general, but the latter are not required to satisfy the provisions in such standards relating to high-speed test performance.

All-season tires customarily employ block elements in their tread designs. The block elements are surrounded by grooves typically having a width at the tread surface of at least 2 mm, although the tread design may include some narrower grooves or "sipes" to improve traction or appearance characteristics of the tire. The net-to-gross ratio of the tread of such tires typically is in the range from about 55% to 70%. The net-to-gross ratio, for purposes of this specification, is defined as the ratio of the net road-contact area of the tread surface divided by the total area of the tread surface (road-contact area plus void area) for a tire under normal inflation pressure. The net-to-gross ratio is measured when the tire is normally loaded at an inflation pressure normal for such load.

The use of blocks as elements in the tread of all-season tires tends to increase the noise level generated by such tires as compared to rib-type radial-ply pneumatic tires conventionally used in passenger and light-truck vehicle applications. Also, such blocks have a tendency toward irregular wear due primarily to their lack of stiffness in the circumferential direction of the tread. Such noise generation and irregular wear are accentuated at acute angles in the rubber blocks formed by intersections of groove walls.

As the rubber blocks enter the area of contact of the tread surface of the tire with a paved road surface, the entering portion of the block compresses and then, as the block passes through the mid-region of the contact area, becomes elongated causing the block to scrub the pavement. This can result in irregular wear. On the other hand, noise generation occurs when edges of the blocks impact the pavement. Noise levels produced by all-season tires, as compared to rib-type tires, are generally greater and are caused in large part by the impacts of block edges with the paved road surface.

SUMMARY OF THE INVENTION

An object of the invention is to overcome the aforementioned undesirable features of all-season radial-ply pneumatic tires, while simultaneously maintaining their traction characteristics and improving their uniformity of wear and noise qualities.

In accordance with the invention, an all-season radial-ply pneumatic tire for passenger and light-truck vehicles comprises at least one radial carcass ply and a belt structure positioned radially outwardly of the carcass ply. The belt structure includes at least one ply of cords, which may be of either textile or steel materials. The belt structure has its cords oriented at both positive and negative angles, in the magnitude range from 17° to 30°, with respect to the mid-circumferential plane of the tire.

A rubber tread is positioned radially outwardly of the belt structure and has a surface adapted for use on paved road surfaces. The tread has grooves of width at the tread surface of at least 2 mm and the net-to-gross ratio of the tread is greater than about 55%. The grooves define blocks of rubber surrounded either fully by such grooves or by such grooves and the lateral edges of the tread road-contact surface. The rubber blocks are spaced apart circumferentially around the tread. Circumferentially-spaced corners of the rubber blocks are chamfered toward the bottoms of the respective grooves forming such chamfered corners, thereby, to increase the stiffnesses of the chamfered rubber blocks as compared to such stiffnesses in the absence of the chamfers. This improves the uniformity of wear of the rubber blocks by helping to prevent irregular wear from being initiated. Such wear, once initiated, tends to continue to occur throughout the life of the radial tire tread.

The invention may be better understood by reference to the detailed description which follows and to the drawings.

DETAILED DESCRIPTION

Figure 1:
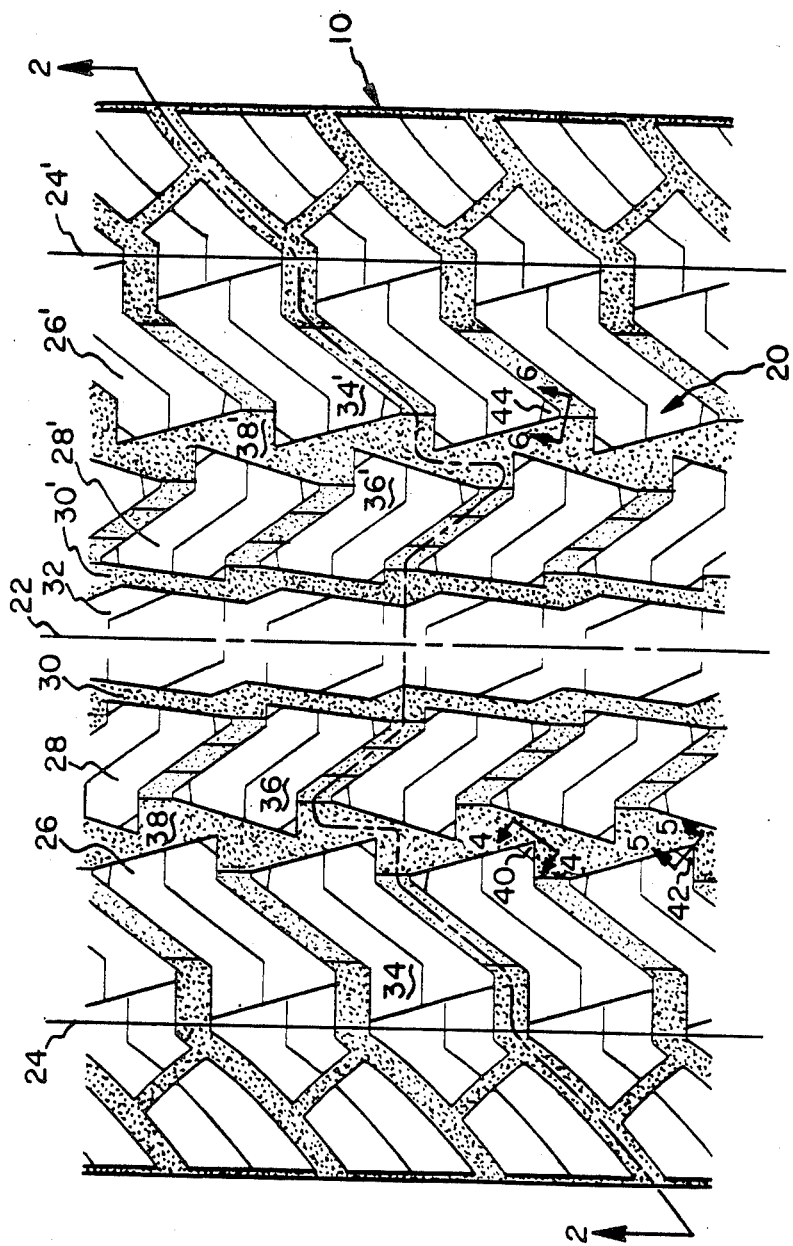
FIG. 1 is a partial plan view of the tread of an all-season radial-ply pneumatic tire according to the invention.

In the drawings, symmetrically similar components on the right-hand side of the figures are given primed numerals corresponding to the components on the left-hand side.

Figure 2:
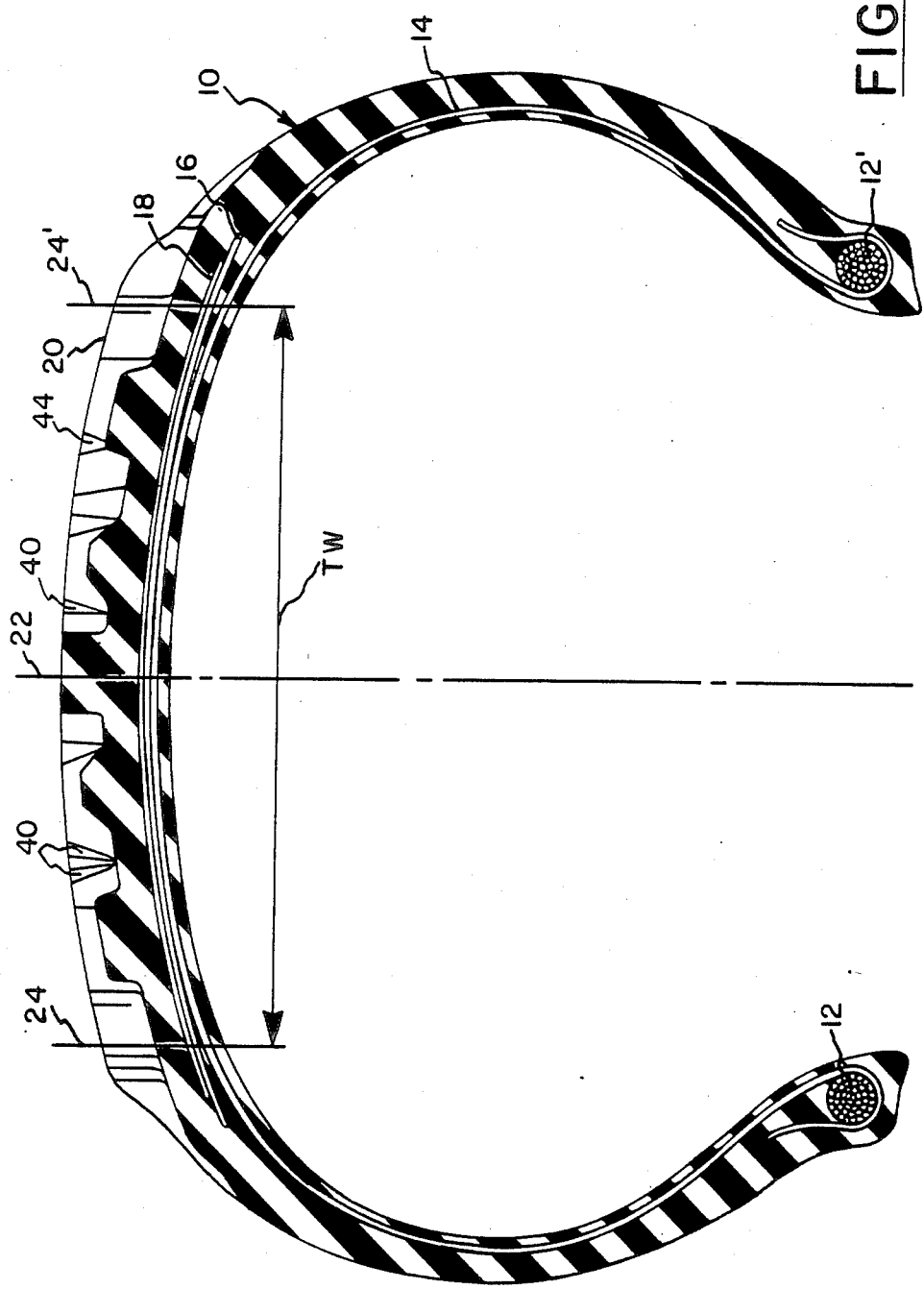
FIG. 2 is a sectional view of the pneumatic tire of FIG. 1, the section being taken along the line 2—2 in FIG. 1.

With particular reference now to FIGS. 1 and 2, there is shown a radial-ply pneumatic tire, generally designated by the numeral 10, having beads 12, 12' between which at least one carcass ply 14 extends within a rubber matrix. Carcass ply 14 has cords which are oriented in the radial direction of the tire. A belt structure is provided and is positioned radially outwardly of the carcass ply as viewed at the mid-circumferential plane 22 of the tire. The belt structure includes at least one ply of cords that are oriented at both positive and negative angles with respect to the mid-circumferential plane. The positive and negative angles of the cords in the belt structure fall in the magnitude range from 17° to 30°. Preferably, the belt structure has at least two plies 16 and 18, the cords in the ply 16 being oppositely oriented with regard to the mid-circumferential plane 22 as compared to the parallel cords in the belt ply 18.

The term "cord" as used herein is meant to include both textile and steel cord or cable.

The pneumatic tire 10 has an all-season tread design 20 most clearly illustrated in FIG. 1 but with details of certain groove segments more clearly seen in FIG. 2.

The rubber tread 20 is positioned radially outwardly of the belt structure and has a surface that is adapted for use on paved road surfaces. The tread has grooves that are of width at the tread surface of at least 2 mm. All of the grooves hereinafter mentioned are to be considered to have widths equal to or greater than the minimum width of 2 mm. The tread width TW in FIG. 2 is indicated by the lines 24, 24' appearing at the respective lateral edges of the tread surface. These lines approximately define the portion of the tread in contact with a paved road surface when the pneumatic tire is under loads normal for its customary use as a passenger vehicle or light-truck tire.

The tread 20 includes two rows of rubber blocks 26, 26' individually designated by the numerals 34, 34'. The rubber blocks 34, 34' extend circumferentially around the tire and are defined by circumferential grooves 38, 38' and by groove segments that extend to the lateral edges 24, 24' of the tread surface. The groove segments separate the rubber blocks 34, 34' from one another. The tread 20 also includes third and fourth rows 28, 28' of rubber blocks that extend circumferentially around the tire. The individual blocks 36, 36' in the respective rows 28, 28' also have groove segments separating them from one another. The third and fourth rows 28, 28' are spaced from the mid-circumferential plane 22 and are separated from one another by circumferentially-extending grooves 30, 30' and the circumferentially-extending rib 32, which is defined by grooves 30, 30'.

The blocks 34, 34' are identical to one another, except as to dimensional variations arising from normal circumferential pitching relationships commonly used in pneumatic tires to control tire noise. However, blocks 34' could be made the mirror images of blocks 34, as could blocks 36 be made the mirror images of blocks 36'. Were such changes to be made, the tread design would be converted from a non-directional tire to a tire that is directional in character, which in some cases provides traction or performance advantages not available in a non-directional design.

Figure 3:
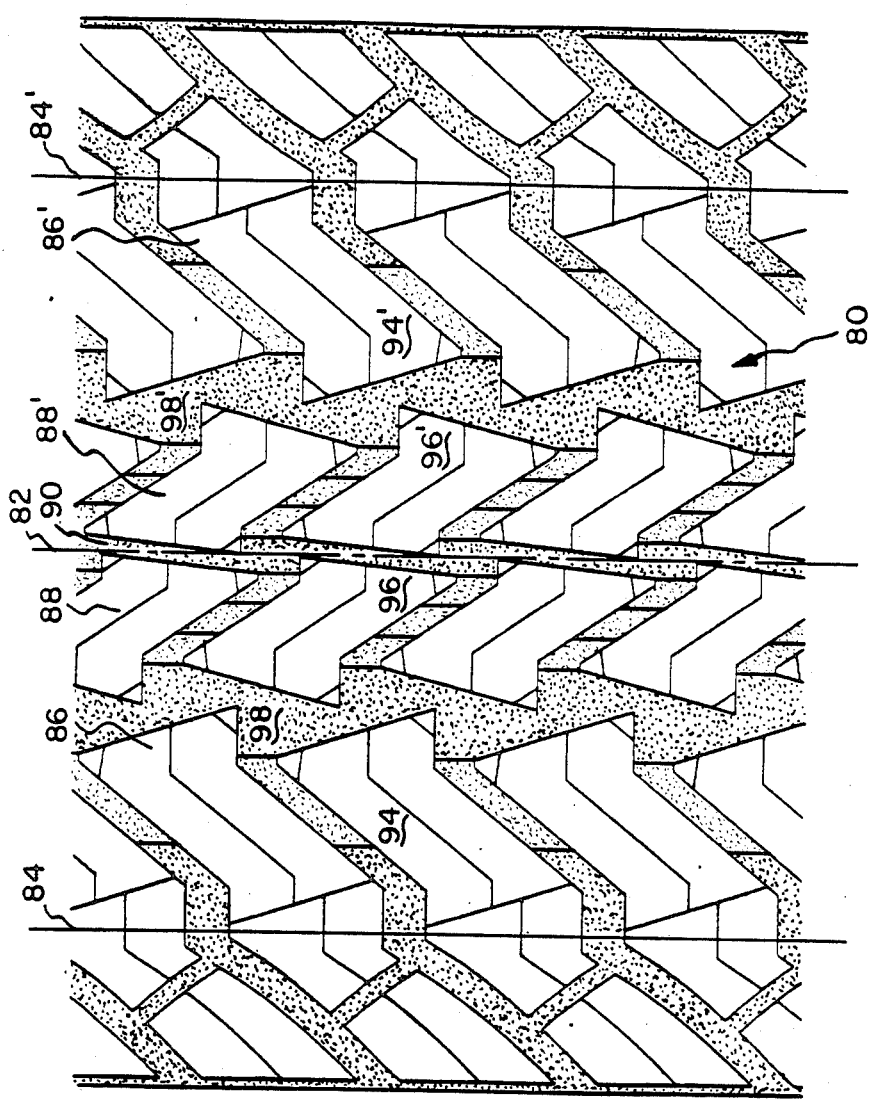
FIG. 3 is a partial plan view of a tire tread similar to that shown in FIG. 1, but having a circumferential groove in the mid-circumferential plane rather than a rib.

With particular reference now to FIG. 3, the tread design generally designated by the numeral 80 includes laterally opposed rows of block elements 86, 86' that extend over to the lateral edges 84, 84' of the tread surface. Circumferential grooves 98, 98' separate these blocks 94, 94' from the blocks 96, 96' in the inner circumferentially-extending rows 88, 88'. The outer rows 86, 86' extend circumferentially around the tread as do the inner rows 88, 88'. Groove segments separate the individual blocks in the various rows.

The tread surface 80 of FIG. 3 differs from that of FIG. 1 primarily in that it includes a circumferentially-extending groove 90 at the mid-circumferential plane, the groove 90 separating the rows 88 and 88' from one another laterally, and by the absence of a center rib or equivalent row of blocks.

Figure 4:
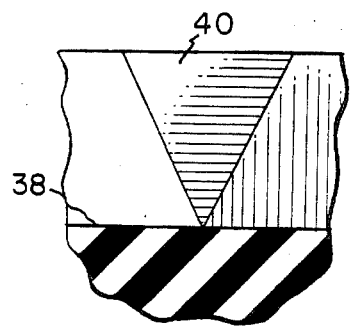
FIG. 4 is a partial elevational view, taken in the direction 4—4 in FIG. 1, illustrating a chamfer at the intersection of two walls of a rubber block in the tread shown in FIGS. 1 and 2.
Figure 5:
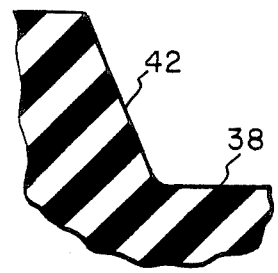
FIG. 5 is a partial sectional elevational view taken along the line 5—5 in FIG. 1 and illustrates the manner in which the chamfer of FIG. 4 extends toward and to the bottom of a groove defining the rubber block.
Figure 6:
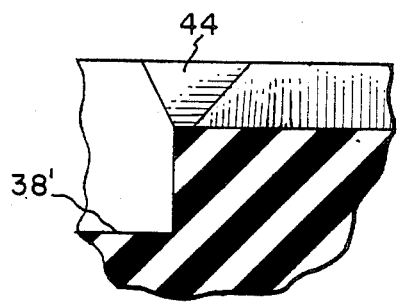
FIG. 6 is a partial sectional elevational view, in the direction 6—6 in FIG. 1 and illustrates a chamfer extending toward and to the bottom of a groove segment of reduced depth as compared to the average depth of other groove segments surrounding one of the rubber blocks.

With particular reference now to FIGS. 1, 4, 5, and 6, it may be seen that the various rubber blocks 34, 34' and 36, 36' are formed by the circumferential grooves 38, 38' and 30, 30', as well as by the groove segments extending between the circumferential grooves or between the grooves 38, 38' and the respective tread lateral edges 24, 24'. Intersections of the groove walls form corner angles which are acute on the tread surface; the corner edges are chamfered as shown at 40, 42 and 44. In FIG. 4, surface 40 is a chamfer that slopes toward the observer as it approaches the bottom of the groove 38. FIG. 5 shows this same chamfer in sectional view at 42 and thus illustrates the true length of the chamfered surface as it goes to the bottom of groove 38. In FIG. 6, the chamfer surface 44 slopes to the bottom of a groove segment that connects the circumferential groove 38' and the lateral edge of the tread 24'. The groove segment at such location has a portion that is of reduced depth, which accordingly accounts for the difference in length, slope, and shape of the chamfered surface.

Rubber blocks 34, 34' of rows 26, 26' have circumferentially-spaced chamfers on their sides; there are two acute-angle corner chamfers on each block. On the other hand, rubber blocks 36, 36' in rows 28, 28' have four acute-angle corner chamfers which are spaced apart both laterally and circumferentially on the tread surface.

The chamfers extend toward and preferably to the bottom of the grooves with which they are associated, as indicated in the drawings, and increase the stiffnesses of the rubber blocks with which they are associated, particularly in the circumferential direction. This is of importance in improving the uniformity of wear of the respective portions of the tread surface represented by the individual blocks. It also has been found to reduce the amplitudes of sound frequencies generated by the tire when in use. In the rubber tread blocks, acute angles of groove-wall intersection are of greater concern with regard to both noise generation and irregular tread wear than are obtuse angles of intersection. The acute corner angles make the rubber blocks relatively flexible at the corner locations and also cause more force per unit area, or pressure, to be generated from their impact with the pavement. The flexibility allows scrubbing or scuffing of the rubber blocks in contact with the pavement, with a resultant tendency for nonuniform or irregular wear to occur.

Variation of the sizes or slopes (configuration) of the chamfers of the rubber blocks may be used to vary the stiffnesses of the blocks to control tire wear characteristics and for the selective elimination of undesirable frequencies or amplitudes in the spectrum of sound generated by the tire in normal use. Configurations of the chamfers may be varied as a function of the pitch variations customarily used in the design and manufacture of pneumatic tires primarily for noise control.

Based upon the foregoing description of the invention, what is claimed is:

1. An all-season radial-ply pneumatic tire for passenger and light-truck vehicles, the tire comprising:
   (a) a radial carcass ply;
   (b) a belt structure positioned radially outwardly of the carcass ply, the belt structure including at least one ply of cords, the belt structure having cords oriented at both positive and negative angles, in the magnitude range from 17° to 30°, with respect to the mid-circumferential plane of the tire; and
   (c) a rubber tread positioned radially outwardly of the belt structure and having a surface adapted for use on paved road surfaces, the tread having grooves of width at the tread surface of at least 2 mm and the net-to-gross ratio of the tread being greater than 55%, such grooves defining blocks of rubber surrounded either fully by such grooves or by such grooves and the lateral edges of the tread road-contact surface, the rubber blocks being spaced apart circumferentially around the tread, intersecting walls of grooves that define the rubber blocks forming corners, circumferentially-spaced corners of the rubber blocks being chamfered toward the bottoms of the respective grooves that form such chamfered corners, thereby, to increase the stiffnesses of the rubber blocks.

2. An all-season pneumatic tire as in claim 1, wherein the corners are on opposite sides of the rubber blocks and are spaced apart both laterally and circumferentially on the tread surface.

3. An all-season pneumatic tire as in claim 1 or 2, wherein the corner angles at the tread surface are acute.

4. An all-season pneumatic tire as in claim 1, wherein the chamfers extend to the bottoms of the respective grooves.

5. An all-season pneumatic tire as in claims 1 or 2, wherein the corner angles at the tread surface are acute and the chamfers extend to the bottoms of the respective grooves.

6. An all-season pneumatic tire as in claims 1, 2, or 3, wherein the chamfers decrease the amplitude of sound frequencies generated by the tire as compared to the amplitude of such frequencies in the absence of such chamfers.

7. An all-season pneumatic tire as in claims 1, 2, or 3, wherein the configuration of the chamfers vary, thereby, to control tread wear characteristics.

8. An all-season pneumatic tire as in claims 1, 2, or 3, wherein the configuration of the chamfers vary, thereby, to achieve selective elimination of undesirable frequencies or amplitudes in the tire's sound spectrum.

* * * * *